United States Patent [19]

Crane, Jr.

[11] Patent Number: 4,743,114
[45] Date of Patent: May 10, 1988

[54] FABRY-PEROT SCANNING AND NUTATING IMAGING COHERENT RADIOMETER

[75] Inventor: Robert Crane, Jr., Westport, Conn.

[73] Assignee: The Perkin-Elmer Corporation, Norwalk, Conn.

[21] Appl. No.: 884,695

[22] Filed: Jul. 11, 1986

[51] Int. Cl.$^4$ .................................................. G01J 3/45
[52] U.S. Cl. ..................................... 356/346; 356/351; 356/352
[58] Field of Search ......................... 356/346, 351, 352

[56] References Cited

U.S. PATENT DOCUMENTS

| | | | |
|---|---|---|---|
| 3,824,018 | 7/1974 | Crane, Jr. | 356/352 |
| 4,170,416 | 10/1979 | Feucil | 356/346 |
| 4,536,089 | 8/1985 | Siebert | 356/352 |

Primary Examiner—Davis L. Willis
Assistant Examiner—Matthew W. Koren
Attorney, Agent, or Firm—Thomas P. Murphy; Edwin T. Grimes; Francis L. Masselle

[57] ABSTRACT

An imaging coherent radiometer incorporating a Fabry-Perot interferometer which is scanned or nutated, for detecting and determining location and wavelength of coherent radiation or the coherent absence of radiation in the presence of non-coherent ambient radiation.

7 Claims, 2 Drawing Sheets

FABRY-PEROT SCANNING AND NUTATING IMAGING COHERENT RADIOMETER

BACKGROUND OF THE INVENTION

The present invention relates to a device for detecting the presence of coherent radiation or the coherent absence of radiation in the presence of non-coherent background radiation. More particularly, the present invention relates to the use of an imaging optical radiometer to make such detections and determine the direction and wavelength of such radiation or such lack of radiation.

Imaging optical radiometers, constructed in accordance with the concept of this invention are adapted, among other possible uses for detecting and determining the wavelength of coherent radiation or the coherent absence of radiation. In addition, it can be used to determine the direction of arrival of the source of coherent radiation or coherent absence of radiation and indicate such position in a display of the field of view.

Such a device can find application in specific gas cloud detection, oil and mineral exploration and detection through Fraunhofer line discrimination techniques, and intelligence surveillance.

Conventional laser receivers use a narrow-band optical filter or diffraction gratings in combination with a photodetector, bandpass amplifier and thresholded peak detector to detect the presence of coherent radiation. This approach has two disadvantages: one, the laser wavelength must be known and two, the video bandwidth required to pass nanosecond pulses also passes a lot of detector and/or background photon noise. The coherent radiometer approach has a broad spectral response and a noise integration time limited only by the available observation time.

The prior art is evidenced by U.S. Pat. Nos. 3,824,018 to R. Crane Jr. and U.S. Pat. No. 4,309,108 to E. Seibert, both of which are assigned to the same assignee as the present application. The aforementioned patents disclose the use of Fabry-Perot etalon interferometers.

While the prior art devices detect presence, wavelength and direction of arrival of coherent radiation from a single source, our contribution is to do so for all coherent sources within a scene, resulting in an imaging coherent radiometer with longer integration times for sensitivity enhancement, to also do so for coherent absence of radiation, and for other advantages, as will become apparent as the description proceeds.

SUMMARY OF THE INVENTION

The present application is related to U.S. patent application Ser. No. 884,694 entitled "Imaging Coherent Radiometer" which is assigned to the same assignee as the present invention and filed on even date therewith.

The present invention contemplates the provision of a new and improved apparatus using a Fabry-Perot interferometer to detect the presence, wavelength and direction of coherent radiation or the coherent absence of radiation in the presence of non-coherent radiation.

The optical path difference or OPD of the unequal path interferometers used in the present invention are carefully chosen. Coherent radiation, such as that produced by laser light, may be characterized by its unique coherent properties: spatial, spectral, temporal and polarization. The temporal coherent property is described in terms of coherence length and is the property used in the present invention to distinguish coherent radiation from noncoherent radiation. This is because it is specific to laser radiation and unique relative to a natural background or foreground radiation that laser radiation has a long coherence length relative to non-coherent radiation. In addition, the coherence length signature of laser radiation is not distorted by natural propagation effects. The unequal path interferometer OPD is selected so that it is longer than the coherence length of the non-coherent background or foreground radiation and shorter than the coherence length of coherent radiation. The OPD is modulated, with the result that the noncoherent radiation will be substantially unmodulated leaving only the coherent laser energy modulated at the interferometer output.

One form of the device to accomplish the objectives of the present invention comprises, in combination, an unequal path interferometer which is angle scanned or rotated through a limited angle about an axis normal to the optical axis of the incoming radiation. The preferred embodiment utilizes a Fabry-Perot etalon.

A row of detectors is located on the side of the etalon opposite the incoming radiation and parallel to the axis of rotation. A cylindrical lens, with no power in the plane of etalon scan, serves to focus the radiation passing through the etalon onto the row of detectors. The output from these detectors indicates the varying constructive and destructive interference of the recombined coherent radiation components of the incoming radiation as the etalon is scanned as described above. The signals these detectors produce can be processed for the location and wavelength of one or a plurality of coherent radiation sources in a scene being scanned. The same analysis can be performed for the coherent absence of radiation.

Another form of the device to accomplish the objectives of the present invention comprises, in combination, an unequal path interferometer which is nutated. The preferred embodiment utilizes a Fabry-Perot interferometer.

Unlike the form just previously described, the present form has an etalon which is rotated about two mutually perpendicular axes, each rotation to some maximum tilt angle. The two mutually perpendicular scans are at two different frequencies so that the processor can distinguish direction information for the two axes of the scan. Accordingly, the surface described by the intersection of the collimated incoming radiation and the etalon's front partially reflecting surface will resemble a Lissajous figure with more cycles in one direction than in the orthogonal direction.

The nutating Fabry-Perot etalon uses a single detector to sense the varying constructive and destructive interference of the recombined coherent radiation components of the incoming radiation as the etalon is nutated as described. The advantage of a nutating system over an angle scan system is that only one detector and amplifier channel are required and no cylindrical lens is required. The information from the single detector is then processed to determine the direction of arrival and wavelength of radiation in the scene being viewed.

The nutating Fabry-Perot etalon system requires more complex computation than the angle-scanned system. In some applications, however, it may be advantageous to have a very simple sensor head, with the computer located remotely where its size is not critical, such as a satellite borne sensor and earth based computer.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which the disclosure is based may readily by utilized as a basis for designing other structures for carrying out the several purposes of the invention. It is important, therefore, that the claims be regarded as including such equivalent structures as do not depart from the spirit and scope of the invention.

Specific embodiments of the invention have been chosen for purposes of illustration and description, and are shown in the accompanying drawings, forming a part of the specification.

DETAILED DESCRIPTION OF A PREFERRED EMBODIMENT

It will be appreciated, as the detailed description proceeds, that many different forms and combinations of interferometers and coherent energy modulators may be employed to carry out the concepts of this invention. For the purpose of illustration, a Fabry-Perot interferometer is employed in the description which follows.

Further, while the invention is described herein in reference to detecting coherent radiation, it should be understood that it has application as well in detecting the coherent absence of radiation.

An example of the coherent absence of energy is an absorption line. Absorption, generally, is the removal of energy from radation by the medium through which the radiation is passing. For low or ambient pressure gas the absorption line can be very narrow, as narrow as the coherent radiation detectable by the apparatus hereinbelow described.

Figure 1:
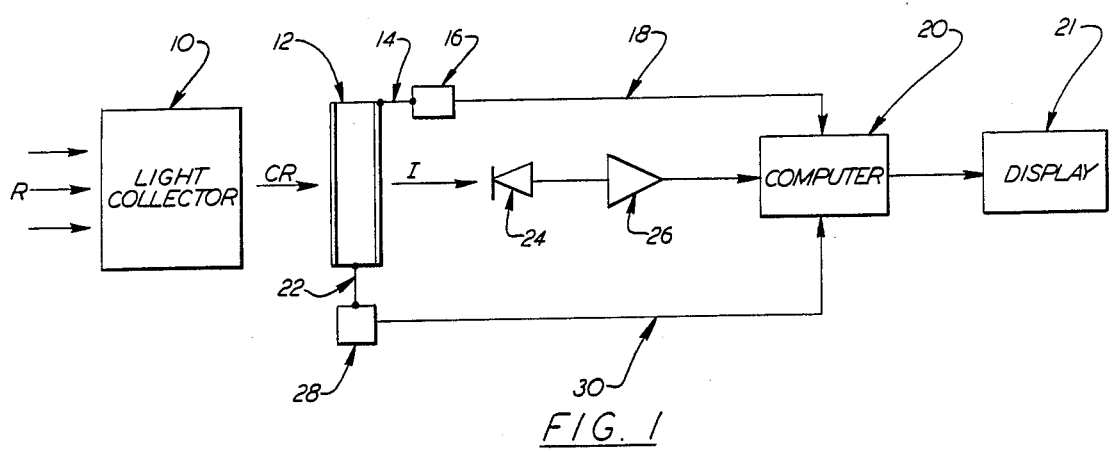
FIG. 1 is a block diagram of a coherent energy radiometer.

FIG. 1 shows, in block diagram form, the components of a scanning or nutating Fabry-Perot interferometer imaging coherent radiometer. Incoming radiation, designated "R", passes through any convenient light collector 10 whereupon it emerges as a collimated beam of light designated "CR". The collimated beam of light "CR", falls incident on a Fabry-Perot etalon 12. In a manner described hereinbelow the etalon 12 produces varying constructive and destructive interference, designated "I", of the coherent energy component of the incoming radiation.

This interference occurs as the etalon 12 is rotated about one or two orthogonal axes. Such rotation is accomplished about one axis by a motor 16 acting through a first linkage 14 on the etalon 12. Rotation about the other axis is provided by a second motor 28 acting through a second linkage 22 on the etalon 12.

The varying constructive and destructive interference is sensed by a detector 24 and amplified by an amplifier 26 which signal then enters a computer 20. Position signals through lines 18 and 30 from motors 16 and 28 respectively are proportional to the angle of rotation of the etalon 12 about its axes. In a manner described hereinbelow the computer 20 then compares the signal from the detector 24 with an internally generated reference waveform to determine the wavelength of the incoming coherent radiation. The computer 20, also in a manner described herein below, determines, based upon the position feedback signals through lines 18 and 30, the direction of arrival of the coherent radiation source in a scene being viewed. This information is then conveyed to an observer through a display 21.

Figure 2:
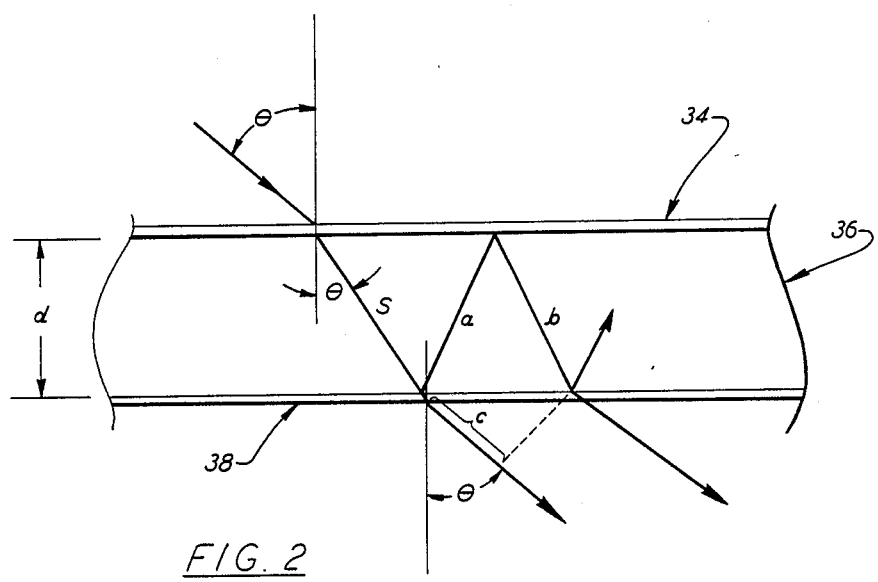
FIG. 2 is a diagram illustrating the geometry of a Fabry-Perot etalon.

FIG. 2 illustrates the geometry of a Fabry-Perot interferometer or etalon. It includes a spacer 36, having an index of refraction n, with optically polished and exactly parallel sides. Each side has a partially reflecting surface 34, 38 disposed thereupon. An incident wave has one component which is directly transmitted and another which is twice reflected. One beam path length is equal to s plus a plus b. The second beam path has the length s plus c. The optical path difference, OPD, through the etalon is:

$$OPD = (s + a + b) - (c + s)$$
$$= (a + b) - c$$

This can easily be calculated from Snell's Law ($Sin\theta = n\ Sin\ \theta'$), in view of the geometry of FIG. 2. It is found to be:

$$OPD = \frac{2nd}{\lambda} Cos\ \theta' = \frac{2d}{\lambda}(n^2 - Sin^2\theta)^{\frac{1}{2}} \qquad (1)$$

where
OPD = optical pathlength difference, in waves
n = index of refraction of etalon spacer material
d = spacer thickness
$\theta$ = angle of incidence
$\theta'$ = angle of incidence inside spacer
$\lambda$ = wavelength The transmission through the etalon is a function of the angle of incidence $\theta$ and the wavelength $\theta$, $\lambda$, of the incident radiation and the reflectivity and transmission of the etalon surfaces. By summing the contributions to the transmitted wave from all possible multiple reflections and expanding, one obtains:

$$T_{fp} = \frac{T^2}{1 - R^2}(1 + 2RCos\phi + 2R^2Cos2\phi + 2R^3Cos3\phi + \ldots) \qquad (2)$$

Where
$T_{fp}$ = transmission of a Fabry-Perot etalon
R = reflectivity of etalon surfaces
$\phi = (2\pi)$OPD = optical phase difference
$\lambda$ = wavelength
T = transmission of etalon surfaces When R is close to unity, there are many multiple reflected wavelets contributing to the transmitted wave and the etalon is said to have high finesse. High finesse etalons are used for very narrow band spectral filters because of their narrow transmission characteristics as a function of wavelength. On the other hand, when reflectivity is moderate, the etalon is said to have low finesse. This type of etalon is best suited for coherent radiation detection.

When a source is spectrally incoherent it emits light at many wavelengths. Therefore, to find the transmission of a Fabry-Perot etalon one must average over all wavelengths weighted by the spectral intensity. Referring to equation 2 for the transmission of a Fabry-Perot etalon, it is seen that when the spectrum of the source is broad (i.e, large variations in $\phi$), the oscillating terms in the equation for $T_{fp}$ will average to zero. The transmission of the etalon will become a constant, independent of the OPD, consequently independent of the angle of incidence, wavelength and etalon thickness. Such a source will be unmodulated as these parameters are varied. It can be assured that $\phi$ will go through large variations for all but the narrowest, or most coherent, sources by merely making the etalon thickness, d, sufficiently large.

For a source to be coherent, the variation in $\phi$ must be small (less than $\pi$). The spectral width, $\Delta\lambda$, of the source must satisfy the equation:

$$\Delta\lambda/\lambda < \lambda/4nd \qquad (3)$$

where $\lambda$, $\Delta\lambda$, n, $\phi$ and d have the meaning hereinbefore defined.

A preselected etalon thickness, d, depending upon the spectral range, is selected to allow such spatially coherent radiation to be modulated while still not modulating the background, or non-coherent, radiation.

Figure 3:
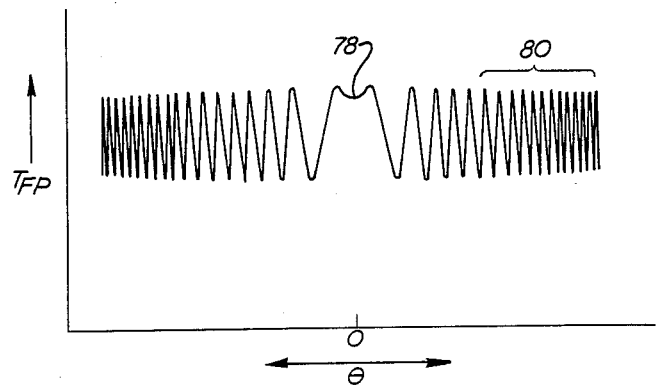
FIG. 3 is a graphical representation of the electrical signal obtained from a detector in the coherent energy radiometer of FIG. 1 scanning a coherent energy source.
Figure 5:
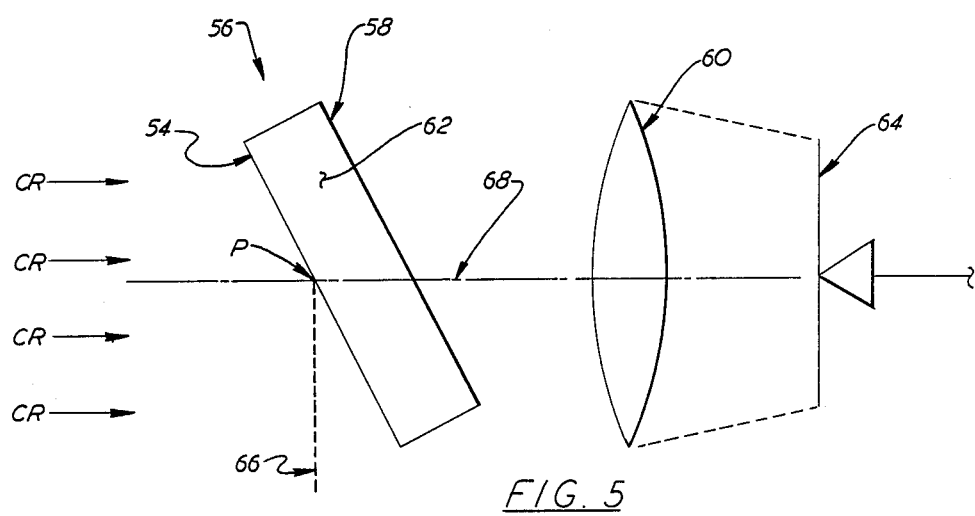
FIG. 5 is a side view diagram illustrating the geometry of a nutating Fabry-Perot etalon interferometer.

FIG. 3 shows the transmission of a Fabry-Perot etalon $T_{fp}$, versus the "scanning" angle of incidence, $\theta$, for a coherent radiation source. Point 78, corresponding to a zero angle of incidence, is readily found on both sides of this normal incidence point. It can be seen that the "frequency" of the quasi-periodic variation from maximum to minimum intensity increases the greater the angle of incidence, $\theta$, becomes. Thus, a frequency discriminator or other device can be used to determine on which side of $\theta=0$ a particular portion of the curve shown in FIG. 5 is and the magnitude of $\theta$. Even if the Fabry-Perot etalon is titled to an angular range not including a zero angle of incidence (e.g., the range indicated by the bracket 80) such a frequency discriminator or other technique can determine the angle of the incoming coherent radiation by interpolating where the point 78 would be.

Figure 4:
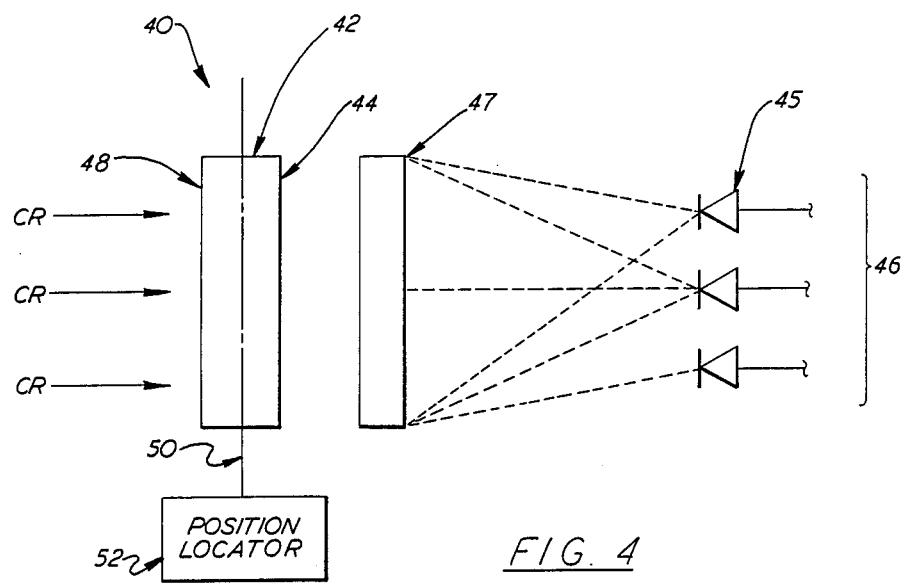
FIG. 4 is a diagram illustrating the geometry of an angle scanned Fabry-Perot etalon interferometer.

FIG. 4 depicts, generally, a Fabry-Perot etalon 40 useful as an angle-scanned interferometer.

The etalon structure itself comprises a transparent spacer 42, such as glass, with optically polished and exactly parallel partially reflective surfaces 48 and 44. Since a relatively "low finesse" etalon is desired, surfaces 48 and 44 are preferably between about 40 to 60 percent reflecting.

The etalon 40 is mounted in any conventional manner, not shown, so as to allow rotation about any axis parallel to its surfaces 48 and 44 and substantially through the center of the etalon. Such an axis is shown as 50.

To provide the imaging capability of an imaging coherent radiometer the present invention provides a row 46 of detectors 45.

The row of detectors 46 is located on the plane through the axis of rotation 50 and normal to the etalon 40 when the angle of rotation of the etalon about that axis is zero. In addition, the row of detectors is located on a plane parallel to the etalon surface 44 when the angle of rotation of the etalon 50 about its axis of rotation 50 is zero. The cylindrical lens 47, one focal length from the row of detectors 46, is disposed between the row of detectors 46 and the etalon 40 and serves to focus the collimated radiation, "CR", which passes through the etalon 40 as a line onto the row of detectors 46. The cylindrical lens 47 has no power in the plane of the etalon scan. The line of radiation focused by the cylindrical lens 47 is incident on the row of detectors 46.

As the etalon rotates each detector detects radiation and produces a signal in a manner previously described in U.S. Pat. No. 3,824,018. Referring to FIG. 3 and the discussion in reference thereto, it can be seen that the detector produces a sinusoidal signal of increasing frequency as the angle of incidence, $\theta$, of the incoming light, "L", increases.

The rate at which this frequency increases is a function of the wavelength of the coherent light incident on the etalon. Through known auto-correlation techniques the signal from the detector is compared with internally generated waveforms of known wavelengths in the computer 20 of FIG. 1. Such comparisons are done to determine the wavelength of the incident coherent radiation.

The direction, from the detector, of the source of coherent radiation is also determined. As previously described, a frequency discriminator or other device can readily determine the angle of incidence, $\theta$, of the curve shown in FIG. 3. Once this is known the position indicator 52 of FIG. 4 is used to determine the angle of rotation of the etalon. The angle of incidence to the etalon, coupled with the angle of rotation of the etalon yields the angle, from the detector, of the source of coherent radiation.

The location, in the scene, of the source of coherent radiation in the direction along the axis of rotation 50 (the vertical direction as shown in FIG. 4) is determined by noting which of the detectors 45 in the row of detectors 46 is detecting coherent radiation. It can be understood that by providing a row of detectors 46 having in excess of the three detectors 45 shown in FIG. 4 greater resolution and sensitivity of the radiometer can be achieved.

It can thus be appreciated that the exact location of a source of coherent radiation in a scene being viewed can be determined. Such a position is described in terms of angle of incidence, $\theta$, and position on the axis of the detector row 46. The position information can then be displayed in any convenient manner, such as the display 21 of FIG. 1.

As can be appreciated by those skilled in the art, detection and processing of a plurality of coherent radiation sources of the same or different wavelengths can proceed simultaneously.

FIG. 5 shows, generally, a nutating interferometer 56. In the embodiment depicted a Fabry-Perot etalon is used.

The Fabry-Perot etalon comprises a glass spacer 62 with optically polished and exactly parallel sides. On each side of the etalon is disposed a partially reflecting surface 54 and 58. Again, a relatively "low finesse" etalon is desired, hence surfaces 54 and 58 are preferably between about 40 to 60 percent reflecting.

The etalon is mounted in a gimbaled housing so as to allow it to rotate freely about point "P". The etalon rotates about two orthogonal axes, axis 66 and and axis 68, at two different frequencies. One frequency is considerably higher than the other. Accordingly, the collimated radiation, designated "CR", describes a Lissajous figure at its points of intersection with the partially reflective surface 54.

The etalon is scanned about two axes, 66 and 68, so that the computer, 20, of FIG. 1, can distinguish from which axis direction information is coming. The lowest frequency should be equal to or greater than one cycle per total field of view dwell time. Expressed symbolically:

$$T < \phi R/V$$

where:
- T = radiometer field of view dwell time
- 0 = total radiometer field of view
- R = distance to scene being viewed
- V = velocity of radiometer scan relative to the scene being viewed The scan frequency, in one direction or about one axis, becomes $> 1/T$.

The second scan must be at a frequency high enough to minimize cross-talk in the computer 20 between the signals generated by the two scans. The ratio of the two scan frequencies is a function of the cross-talk and a desire to minimize scan frequencies in order to minimize bandwidth. The latter factor in turn will enhance signal to noise ratios. A satisfactory ratio of scan frequencies is 5× to 10×.

To provide the imaging capability of an imaging coherent radiometer the nutating interferometer form of the present invention provides a single detector 64 which is substantially the same size as the etalon.

The detector 64 may rotate with the etalon, in which case it is preferably positioned directly behind the etalon; or the detector may be stationary in which case some axial spacing between the etalon and detector is required.

The nutating produces a variety of angles of incidence in both the x and y directions. The result of a nutating scan interferometer with a single detector 64 behind it is that the detector 64 scans a given scene in both the horizontal and vertical directions simultaneously. No imaging lens is required when a nutated etalon is used. Directional information in two orthogonal directions is obtained by processing the signals from a single detector relative to the synchronizing signals from the two orthogonal etalon rotations.

If a simple light collecting optical arrangement is used an optional lens 60 located between the etalon and the detector 64 is used. The lens 60 acts as a "light bucket" to ensure that all light coming out of the etalon is directed to the detector 64. It can be understood by those skilled in the art that in optical arrangements, such as that shown in FIG. 1, where a telescope or light collector 10 is employed the lens 60 is not necessary.

Figure 6:
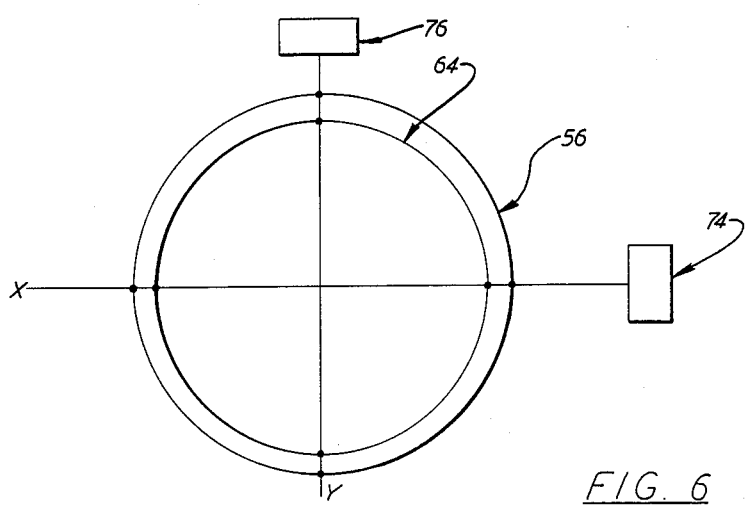
FIG. 6 is a front view diagram illustrating the geometry of a nutating Fabry-Perot etalon interferometer.

Referring now to FIG. 6, two position indicators 74 and 76, for the X and Y axes respectively, provide signals proportional to the amount of rotation of the etalon 56 about the X or Y axes.

At each moment in time the etalon 56 is rotating simultaneously about the X and Y axes. As the etalon 56 is rotating, the detector 64 produces the characteristic waveform shown in FIG. 3 for each of the x and y directions when coherent radiation is incident on the etalon. This waveform is then processed by the computer 20 of FIG. 1 in the manner discussed in reference to FIG. 4 to yield information as to the direction of arrival and wavelength of the coherent radiation incident on the etalon 56.

Position indicator 76 gives the angle of rotation of the etalon 56 about the Y axis. This information, coupled with the information on angle of incidence from the waveform of FIG. 3 is processed by the computer 20 shown in FIG. 1, to give direction of arrival information for the coherent source, or sources, in the scene being viewed in the X direction. Likewise, the angle of rotation from position indicator 74 coupled with the waveform of FIG. 3 processed in the y direction gives the direction of arrival information in the Y direction for a coherent source, or sources, in the scene being viewed. Such information can then be displayed in any convenient manner, such as the display 21, shown in FIG. 1.

It can be appreciated by those skilled in the art that the detection and processing of a plurality of coherent radiation sources of the same or different wavelengths can be accomplished simultaneously by the device disclosed.

The coherent absence of energy is detected and processed in a manner similar to that described hereinabove for coherent energy. The waveform generated when the coherent absence of energy is being scanned will have a polarity opposite that shown in FIG. 3 since the cross-correlation operations used in processing the data are linear functions.

Having thus described the invention with particular reference to the preferred forms thereof, it will be obvious to those skilled in the art to which the invention pertains, after understanding the invention that various changes and modifications may be made therein without departing from the spirit and scope of the invention, as defined by the claims appended hereto.

What is claimed is:

1. Apparatus for determining the direction and wavelength of coherent radiation or coherent absence of radiation in the presence of incoherent ambient radiation which comprises:

a Fabry-Perot etalon having a first surface positioned to receive incoming radiation and a second surface, the distance between said surfaces being such that the optical path difference between the transmitted portions of radiation incident on said first surface is substantially grater than the coherence length of incoherent radiation but substantially less than the coherence length of the coherent radiation;

means for rotating said etalon an equal amount at different angular velocities about each of two mutually perpendicular axes of rotation;

position indicating means to provide a position signal proportional to the angle of rotation of said Fabry-Perot etalon about each of said axes of rotation;

detecting means for detecting the variable signal component caused by the varying constructive and destructive interference of the combined coherent radiation components across the entire area of the wavefront emanating from said Fabry-Perot etalon; and processing means for processing said position signals and said variable signal components through electronic signal processing components to detect, determine direction and wavelength of the coherent energy or coherent absence of energy.

2. Apparatus as claimed in claim 1 wherein said detecting means include:
   a row of detectors sensitive to the varying constructive and destructive interference of the recombined coherent radiation components emanating from said Fabry-Perot etalon so as to generate a cyclical signal of increasing frequency as the coherent radiation from a source or sources makes an increasing angle or angles of incidence with said first surface of said Fabry-Perot etalon;
   focusing means to focus the recombined coherent raidation components emanating from said Fabry-Perot etalon in a line substantially on said row of detectors; and
   said row of detectors being substantially on a plane through the axis of rotation of said Fabry-Perot etalon and substantially on a plane parallel to one of said etalon surfaces.

3. Apparatus as claimed in claim 2 wherein said processing means includes:
   one or more reference waveforms;
   means to compare the waveform generated by each of said detectors with said reference waveform and said position signal so as to determined the angle of incidence in a horizontal plane through each detector and to axis of rotation of the coherent radiation from said source or sources with said first surface of said Fabry-Perot etalon and the wavelength of the radiation from said source or sources;
   means to provide a signal as to which detector is detecting coherent radiation so as to determined vertical position of the said radiation source or sources in a given scene being viewed.

4. Apparatus as claimed in claim 2 wherein said focusing means is an cylindrical lens.

5. Apparatus as claimed in claim 1 wherein said detecting means includes:
   a single detector of substantially the same diameter as said Fabry-Perot etalon with one surface sensitive to the varying constructive and destructive interference of the recombined coherent radiation components emanating from said Fabry-Perot etalon so as to generate a signal of almost periodic form but gradually increasing frequency as the coherent radiation from a source or sources makes an increasing angle or angles of incidence with said first surface of said Fabry-Perot etalon, said single detector being substantially on the optical axis of said Fabry-Perot etalon.

6. Apparatus as claimed in claim 5 wherein said processing means includes:
   a plurality of reference waveforms;
   means to compare the waveform generated by the said single detector with said plurality of reference waveforms and said position signal to determine the direction and the wavelength of said coherent radiation source or sources.

7. Apparatus as claimed in claim 5 which further includes:
   light collecting means to direct all radiation eminating from said Fabry-Perot etalon to said one sensitive surface of said single detector.

* * * * *

UNITED STATES PATENT AND TRADEMARK OFFICE
CERTIFICATE OF CORRECTION

PATENT NO. : 4,743,114

DATED : May 10, 1988

INVENTOR(S) : Robert Crane, Jr.

It is certified that error appears in the above-identified patent and that said Letters Patent are hereby corrected as shown below:

Column 4 line 49, change "$\theta, \lambda ,$" to --,$\lambda$ ,--

Signed and Sealed this

Fifteenth Day of November, 1988

*Attest:*

DONALD J. QUIGG

*Attesting Officer*  Commissioner of Patents and Trademarks